United States Patent
Simon

(10) Patent No.: US 9,523,980 B2
(45) Date of Patent: Dec. 20, 2016

(54) CLOSED LOOP CYCLIC TIMING OPTIMIZER CONTROL SYSTEM AND METHOD

(75) Inventor: Jonathan S. Simon, Pleasant Valley, CT (US)

(73) Assignee: Emhart Glass S.A., Cham (CH)

( * ) Notice: Subject to any disclaimer, the term of this patent is extended or adjusted under 35 U.S.C. 154(b) by 1022 days.

(21) Appl. No.: 13/369,750

(22) Filed: Feb. 9, 2012

(65) Prior Publication Data

US 2012/0226378 A1  Sep. 6, 2012

Related U.S. Application Data

(60) Provisional application No. 61/448,718, filed on Mar. 3, 2011.

(51) Int. Cl.
| | |
|---|---|
| G05D 5/00 | (2006.01) |
| G05D 23/00 | (2006.01) |
| G05B 19/418 | (2006.01) |
| C03B 9/41 | (2006.01) |
| G05B 19/042 | (2006.01) |

(52) U.S. Cl.
CPC .......... *G05B 19/41875* (2013.01); *C03B 9/41* (2013.01); *G05B 19/042* (2013.01); *G05B 2219/25391* (2013.01); *G05B 2219/2635* (2013.01); *Y02P 40/57* (2015.11); *Y02P 90/22* (2015.11)

(58) Field of Classification Search
CPC .................. G05B 19/042; G05B 2219/25391; G05B 2219/2635; G05B 19/41875; C03B 9/41
USPC .................................................... 700/157, 158
See application file for complete search history.

(56) References Cited

U.S. PATENT DOCUMENTS

| | | | |
|---|---|---|---|
| 4,152,134 A * | 5/1979 | Dowling et al. .............. 700/158 |
| 4,338,116 A | 7/1982 | Huff et al. | |
| 4,457,772 A * | 7/1984 | Haynes et al. .................. 65/160 |
| 4,553,217 A * | 11/1985 | Daudt et al. .................. 702/157 |
| 4,615,723 A | 10/1986 | Rodriguez-Fernandez et al. | |
| 4,762,544 A | 8/1988 | Davey | |
| 6,604,383 B2 | 8/2003 | Simon | |
| 6,604,384 B2 | 8/2003 | Simon | |
| 6,604,385 B2 | 8/2003 | Simon | |

(Continued)

FOREIGN PATENT DOCUMENTS

| | | |
|---|---|---|
| EP | 2336740 | 6/2011 |
| GB | 2199319 A | 7/1988 |

(Continued)

*Primary Examiner* — Kenneth M Lo
*Assistant Examiner* — Derrick Boateng
(74) *Attorney, Agent, or Firm* — Reinhart Boerner Van Deuren P.C.

(57) ABSTRACT

A system and method for the optimization of the cycles of events occurring in an I.S. machine that automatically optimizes the cycles of events occurring in an I.S. machine by using information relating to the characteristics of the hot glass containers manufactured by the I.S. machine obtained by monitoring the hot glass containers immediately subsequent to their manufacture. Optionally, information relating to process values associated with the operation of the I.S. machine may also be monitored and used in the optimization of the cycles of events occurring in the I.S. machine. Also optionally, the active limits of the event times may be modified by an operator based upon observations of the operation of the I.S. machine.

20 Claims, 3 Drawing Sheets

(56) References Cited

U.S. PATENT DOCUMENTS

| | | |
|---|---|---|
| 6,604,386 B2 | 8/2003 | Simon |
| 6,606,886 B2 | 8/2003 | Simon |
| 6,705,119 B2 | 3/2004 | Simon |
| 6,705,120 B2 | 3/2004 | Simon |
| 6,711,916 B2 * | 3/2004 | Simon .................... 65/29.11 |
| 6,722,158 B2 | 4/2004 | Simon |
| 6,978,640 B2 | 12/2005 | Mueller et al. |
| 7,290,406 B2 * | 11/2007 | Anheyer .................... 65/163 |
| 7,489,983 B2 | 2/2009 | Simon |
| 2002/0194874 A1 | 12/2002 | Simon |
| 2003/0172675 A1 * | 9/2003 | Mueller et al. ............. 65/29.11 |
| 2005/0096777 A1 * | 5/2005 | Allan et al. ................. 700/157 |
| 2011/0141264 A1 * | 6/2011 | Holtkamp et al. ............. 348/86 |

FOREIGN PATENT DOCUMENTS

| | | |
|---|---|---|
| JP | 57160923 A | 10/1982 |
| JP | 2002321925 A | 11/2002 |

* cited by examiner

CLOSED LOOP CYCLIC TIMING OPTIMIZER CONTROL SYSTEM AND METHOD

IDENTIFICATION OF RELATED PATENT APPLICATIONS

This patent application claims priority of U.S. Provisional Patent Application No. 61/448,718, which is entitled "Closed Loop Cycle Timing Optimizer Control System and Method," and which was filed on Mar. 3, 2011, which patent application is hereby incorporated herein by reference in its entirety.

BACKGROUND OF THE INVENTION

Field of the Invention

The present invention relates generally to the optimization of the cycles of events occurring in an I.S. machine, and more particularly to a system and method for automatically optimizing the cycles of events occurring in an I.S. machine by using information relating to the characteristics of the hot glass containers manufactured by the I.S. machine obtained by monitoring the hot glass containers immediately subsequent to their manufacture.

I.S. (individual section) machines have a plurality of identical sections, each of which has a frame upon which are mounted a number of section mechanisms including blank side and blow side mold open and close mechanisms respectively carrying blank side mold halves and blow side mold halves, an invert and neck ring mechanism, a baffle mechanism, a blowhead mechanism, a plunger mechanism, and a takeout mechanism. Process air is provided to these mechanisms for cooling, as well as for other purposes. Each of the section mechanisms and the valves controlling the supply of process air to various destinations have to be operated at a selected time in a 360 degree section cycle.

In early I.S. machines, devices such as valves which operated the mechanisms and the process air had to be mechanically turned on and off at precise times in each cycle, with the timing process being controlled by a 360 degree mechanical timing drum. The rotation of this mechanical timing drum through 360 degrees equates to the completion of one control cycle of the machine or section, and thus those skilled in the art analyze machine performance in a wrapped cycle repeatedly cycling from zero degrees to 360 degrees. Electronic timing devices replaced mechanical timing drums, and electronic machine controllers have allowed users to electronically adjust the on/off schedule (angles) for the various section mechanisms. Experienced operators with process insight can effectively adjust the machine timing to substantially vary the productivity of an I.S. machine.

A system controlled by a programmable sequencer which defines a machine cycle having a set cycle time was developed by the inventor of the present patent application and is disclosed in U.S. Pat. Nos. 6,604,383, 6,604,384, 6,604,385, 6,604,386, 6,606,886, 6,705,119, 6,705,120, 6,711,916, 6,722,158, and 7,489,983, all of which are assigned to the assignee of the present patent application, and all of which are hereby incorporated herein by reference in their entirety. These patents disclose providing a computerized model of a mathematical representation of a network constraint diagram of the unwrapped bottle forming with the following inputs: the time in an unwrapped bottle forming process for each displacement to occur; the machine cycle time; the motion durations of each of the mechanisms from the retracted position to the advanced position, and from the advanced position to the retracted position, and the collision zones between interfering paths.

While this system represented a substantial step forward, it is readily apparent to one skilled in the art that it is not a closed loop system in that it does not factor in information that can only be derived from an examination of the glass containers being made by the system, other than by manually looking at glass containers at the hot end (the starting end of a glass container manufacturing line where the glass containers are still hot immediately after they are formed) or the cold end (the other end of the glass container manufacturing line at which point the glass containers have completely cooled), noting problems, and attempting to adjust the parameters of the programmable sequencer.

A system and method for monitoring hot glass containers at the hot end as they stream from an I.S. machine manufacturing them is disclosed in European Published Patent Application No. EP 2 336 740 A1, published on Jun. 22, 2011, entitled "Method and System for Monitoring and Controlling a Glass Container Forming Process," in U.S. Patent Application Publication No. US 2011-0141264 A1, published on Jun. 16, 2011, entitled "Method and System for Monitoring and Controlling a Glass Container Forming Process," and in U.S. Patent Application Publication No. US 2011/0141265 A1, published on Jun. 16, 2011, entitled "System and Method for Monitoring Hot Glass Containers to Enhance Their Quality and Control the Forming Process," all three of which are assigned to the assignee of the present patent application, and all three of which are hereby incorporated herein by reference in their entirety.

While these systems and methods enable the quality of hot glass containers manufactured by an I.S. machine to be monitored, it would be beneficial to use the large amount of information available on the characteristics of the hot glass containers provided by these systems and methods to further enhance the quality of the hot glass containers being manufactured by the I.S. machine. In this regard, it would be beneficial to use some of the information regarding the characteristics of the hot glass containers provided by these systems and methods to automatically modify I.S. machine cyclic timing to improve process yield and quality of the hot glass containers being produced while reducing dependence on operator skill by automatically adjusting machine timing and motions.

In general, automatic modification of the I.S. machine cyclic timing to improve yield and quality based upon the information available on the characteristics of the hot glass containers has not been accomplished in the past, and would thus represent a new development.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

SUMMARY OF THE INVENTION

The disadvantages and limitations of the background art discussed above are overcome by the present invention. With this invention, adjustments to process durations in the thermal forming process performed in an I.S. machine are automatically optimized using information relating to the characteristics of hot glass containers manufactured by the I.S. machine which are obtained immediately subsequent to their manufacture. The information relating to the characteristics of hot glass containers is obtained from a glass container measurement system (such as the one described in European Published Patent Application No. EP 2 336 740 A1, U.S. Patent Application Publication No. US 2011-0141264 A1, and U.S. Patent Application Publication No. US 2011/0141265 A1, all of which were incorporated by reference herein in their entirety) as container measurement information that is indicative of certain characteristics of the hot glass containers manufactured by the I.S. machine.

A controller uses the container measurement information in conjunction with desired target setpoints to produce desired process durations that may be used to operate the I.S. machine to produce glass containers having desired characteristics. A cyclic timing adjustment system automatically transforms the desired process durations from the controller into machine timing signals that are applied to the I.S. machine by imposing constraints to maintain a predetermined cyclic order, to avoid mechanical interference or collisions, and to maintain a predetermined total or common cycle period.

In an optional variation, one or more sensors may be used to provide one or more measurements of process values within the I.S. machine. The measurements of process values are provided as process measurement values to the controller, which uses both the process measurement values and the container measurement information to produce the desired process durations used to operate the I.S. machine to produce glass containers having desired characteristics.

In an alternate embodiment, the desired process durations from the controller are automatically transformed into machine timing signals by closed loop cycle optimizer and applied to the I.S. machine. A constraint limited user adjustment interface is provided to enable an operator to vary active limits on the machine timing signals that are provided by the controller for application to the I.S. machine based upon the operator's observation of the operation of the I.S. machine.

DESCRIPTION OF THE DRAWINGS

These and other advantages of the present invention are best understood with reference to the drawings, in which.

DETAILED DESCRIPTION OF THE EXEMPLARY EMBODIMENT

The general challenge faced by any closed loop glass container quality control system is to cope with the coupled and constrained nature of the underlying process while enhancing and optimizing glass container quality. This is addressed by the present invention in a manner that utilizes the hot glass container quality analytical system described in the above-incorporated by reference U.S. Patent Application Publication No. US 2011-0141264 A1 and U.S. Patent Application Publication No. US 2011/0141265 A1, which is capable of providing as an output measurements of various properties of hot glass containers. Prior to a detailed discussion of the present invention, which begins in FIG. 4, it is helpful to present some background of the systems described in the above-identified published patent applications.

Figure 1:
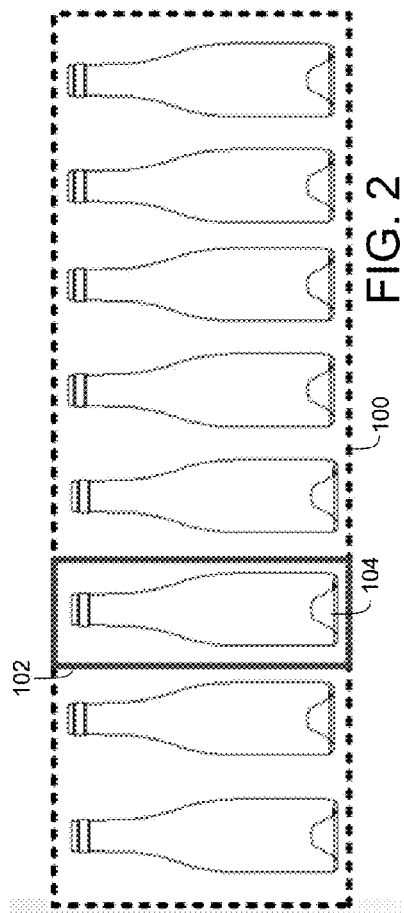
FIG. 1 is a simplified view of a hot glass container quality analytical system showing the essential components thereof as installed in a typical glass container manufacturing line.

Referring then to FIG. 1, the major components of a hot glass container quality analytical system which can provide measurements of various properties of hot glass containers is illustrated in schematic fashion. An I.S. machine 60 has a conveyor 62 extending therefrom on which a stream of hot glass containers 64 are conveyed away from the I.S. machine 60. Two camera modules 66 and 68 are located in positions to monitor the hot glass containers 64 as they pass by the two camera modules 66 and 68 on the conveyor 62. In a preferred embodiment, the camera modules 66 and 68 each include a SWIR (short wave infrared) imaging acquisition device that scans a vertical line which will be used to acquire images of the hot glass containers 64 as they pass by on the conveyor 62. As the hot glass containers 64 pass by, a multiplicity of vertical lines will be scanned that will together form electronic images of the hot glass containers 64.

The first camera module 66 is located with an axis orthogonal to the longitudinal axis of the conveyor 62 on which the hot glass containers 64 travel after leaving the I.S. machine 60, with the first camera module 66 being oriented toward the hot glass containers 64 passing by on the conveyor 62. The second camera module 68 is located with an axis at a predefined angle with respect to the longitudinal axis of the conveyor 62 and on the opposite side of the conveyor 62, with the second camera module 68 also being oriented toward the hot glass containers 64 passing by on the conveyor 62. The camera modules 66 and 68 are preferably located such that their respective axes intersect at a point at the middle of the lateral axis of the conveyor 62, which is at the centerline of the conveyor 62 (if they are not so located, appropriate mathematical compensation may be made).

The camera modules 66 and 68 are connected to a control unit 70 that may be used to calculate and provide the measured glass container placement signal that is indicative of the actual locations of hot glass containers 64 moved onto the conveyer 62. The camera module 66 is connected to the control unit 70 via a connection 72, and the camera module 68 is connected to the control unit 70 via a connection 74. The connections 70 and 72 may be network connections such as TCPIP network connections.

A user interface module 76 is connected to the control unit 70 via a connection 78, which may be a network connection such as a TCPIP network connection. The user interface module 76 may be used both to display information generated by the hot glass container quality analytical system as well as to set up the hot glass container quality analytical system. Further, the information generated by the hot glass container quality analytical system and displayed on the user interface module 76 may be used to provide measured glass container quality information that may be used to enhance and optimize glass container quality.

Based upon the information generated by the hot glass container quality analytical system, the hot glass containers 64 that are determined to be of unacceptable quality by the hot glass container quality analytical system may be rejected and removed from the stream of the hot glass containers 64 on the conveyor 62. A glass container reject mechanism 80 that performs this function is operated by the control unit 70 via a connection 82, which may be a simple trigger signal such as a twenty-four Volt pulse.

The hot glass container quality analytical system is provided with timing pulses by an I.S. machine control unit 84 via a connection 86. These timing pulses are used by the hot glass container quality analytical system to define from which section and which mold each of the hot glass containers 64 on the conveyor 62 originates. In this way, the hot glass container quality analytical system can display this information to an operator accessing the user interface module the administrative console 76 and provide it as feedback to enhance and optimize glass container quality. The present invention contemplates that the information generated by this system may be used to automatically enhance and optimize glass container quality through the I.S. machine control unit 84 via the connection 86.

It may be noted that the control unit 70 of the hot glass container quality analytical system of the present invention is depicted as having another connection 88, the distal end of which is not shown as being connected in FIG. 1. This connection 88, which may also be a network connection such as a TCPIP network connection, may be used to connect additional remote control units (not shown in FIG. 1) which may be located, for example, in a control room at the glass container manufacturing plant at which the I.S. machine 60 is located, in an engineer's office either at that manufacturing plant or at another remote location, and/or in another remote location such as, for example, the hot glass container quality analytical system provider's facility to remotely monitor and troubleshoot the system at customer locations.

Figure 2:
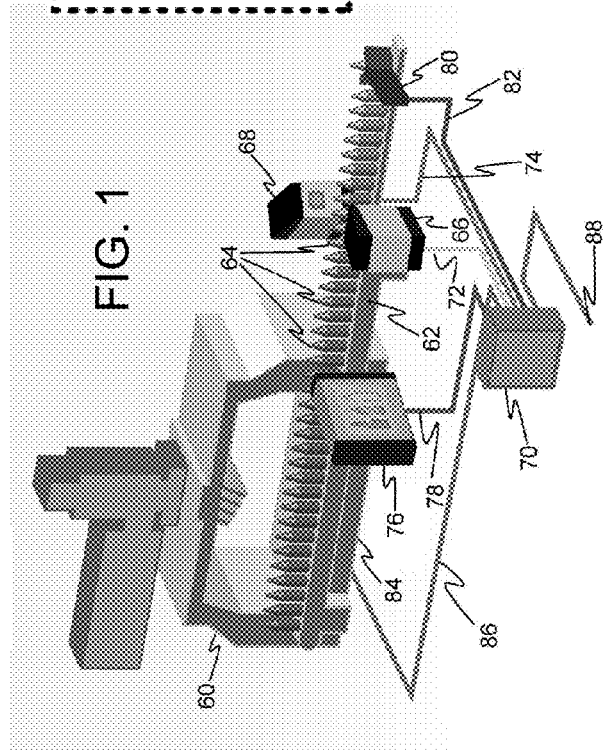
FIG. 2 is a schematic drawing of a plurality of hot glass containers in a continuing digital "filmstrip" of images showing an image of a single hot glass container to be extracted from the "filmstrip" of images.

Referring next to FIG. 2, the line scan input from the cameras has the images extracted module to produce digital "filmstrips" of images 100 of the hot glass containers. This provides a frame of each hot glass container, such as the single hot glass container image frame 102 in which the single hot glass container image 104 is located. It will be appreciated that the single hot glass container image 104 consists of a selected number of horizontal lines and a selected number of vertical lines that are respectively determined by the vertical resolution of one of the infrared cameras and the scan frequency. Once the single hot glass container image 104 has been extracted from each of the infrared cameras, they may be analyzed.

Figure 3:
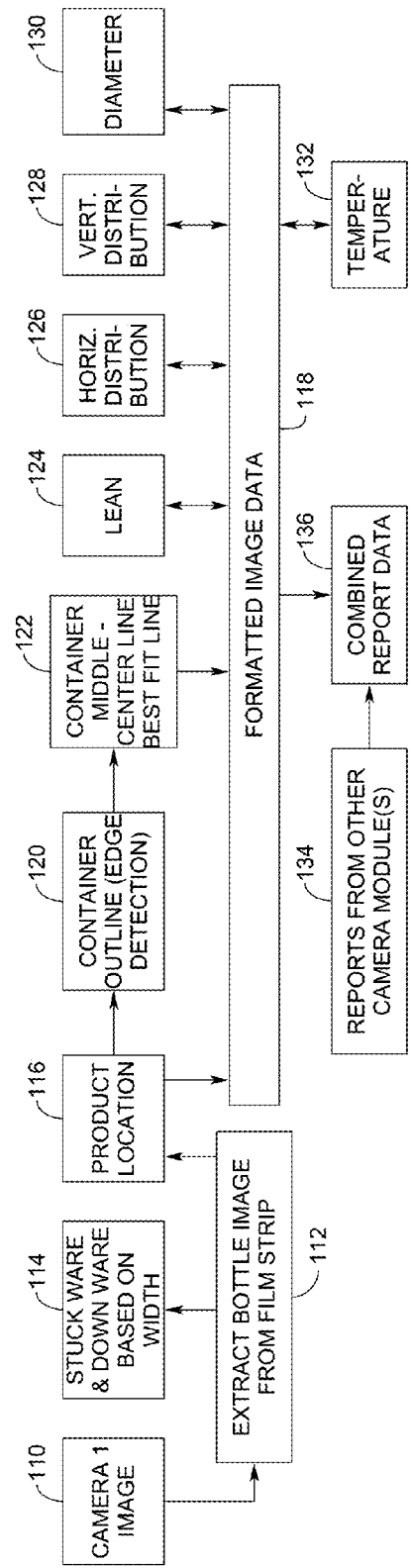
FIG. 3 is a schematic depiction showing the data flow from the image of the single hot glass container extracted from the "filmstrip" of images shown in FIG. 2.

Referring next to FIG. 3, the flow of formatted data based upon the information from the infrared cameras is illustrated. The image from a first camera image 110 is provided to an image extraction module 112, which extracts images of the hot glass containers 64. The images are provided to a stuck ware/down ware module 114 which will identify stuck ware and/or down ware based on width characteristics (and, in the case of down ware, height characteristics) of the image. The images are also provided to a product location module 116, which identifies the location of the hot glass containers 64 on the conveyor 62 (shown in FIG. 8). It will be appreciated that the product location module 116 must also have images obtained from another camera in order to provide both longitudinal and lateral displacement information regarding the hot glass containers 64 on the conveyor 62. Formatted image data regarding product location is supplied from the product location module 116 to a formatted image data bus 118.

The image information from the product location module 116 is also provided to an outline detection module 120, which uses edge detection to identify the outline of the glass containers. This data is provided to a center line determination module 122 that determines the best fit center line of the outline of the glass containers and provides formatted image data of the same to the formatted image data bus 118. A lean determination module 124 determines the lean of the outline of the glass containers and provides formatted image data of the same to the formatted image data bus 118.

A horizontal distribution determination module 126 determines the horizontal distribution of the outline of the glass containers and provides formatted image data of the same to the formatted image data bus 118. A vertical distribution determination module 128 determines the vertical distribution of the outline of the glass containers and provides formatted image data of the same to the formatted image data bus 118. A diameter determination module 130 determines the diameter of the outline of the glass containers and provides formatted image data of the same to the formatted image data bus 118. A temperature calculation module 132 determines the temperature of each hot glass container 64, and provides formatted image data of the same to the formatted image data bus 118. The formatted image data from the formatted image data bus 118 is used together with formatted image data from reports from other camera modules 134 to generate combined report data 136.

Figure 4:
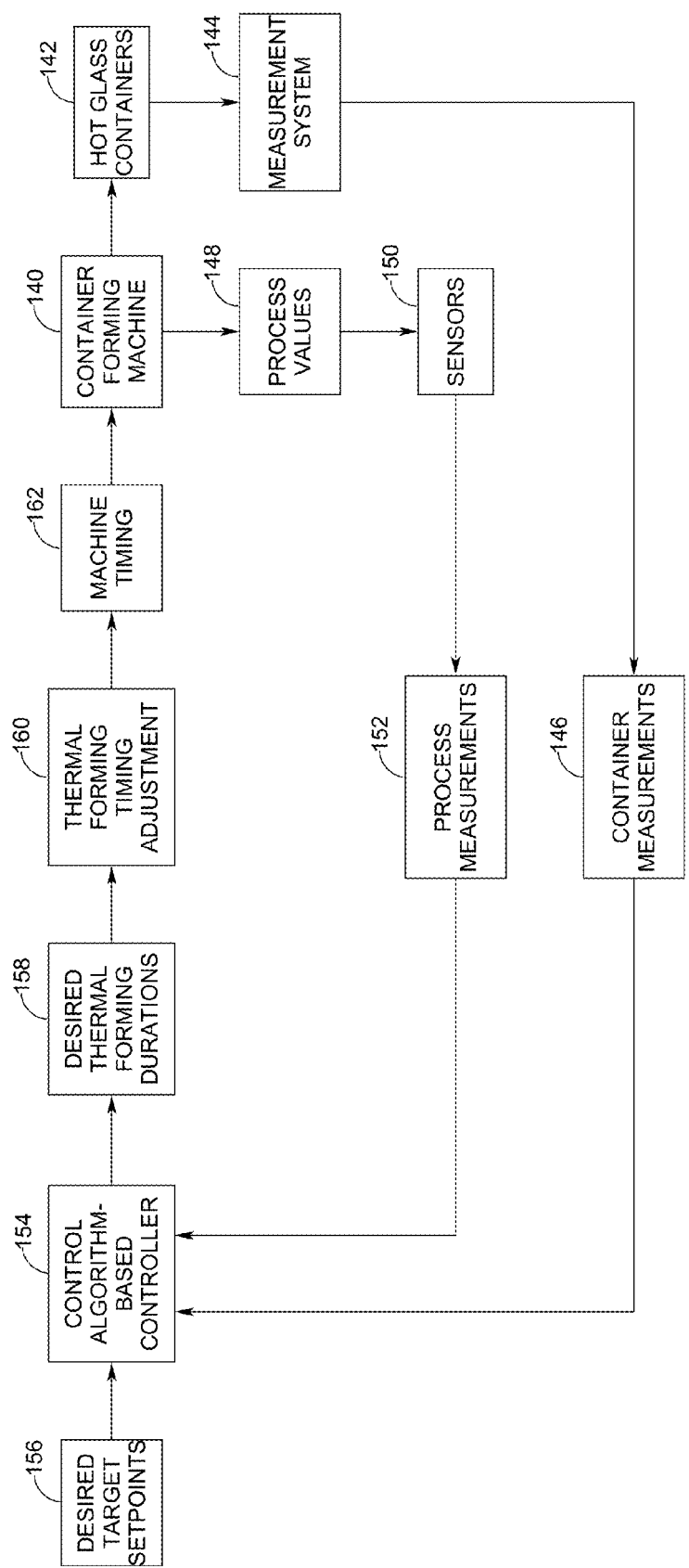
FIG. 4 is a is a functional schematic depiction of a first embodiment of the closed loop cyclic timing optimizer control system of the present invention.

The present invention is schematically illustrated in FIG. 4 in an exemplary embodiment implementing a feedback control loop. A glass container forming machine 140 (such as the I.S. machine 60 described above in FIG. 1) molds hot glass containers 142. Various characteristics of the hot glass containers 142 manufactured by the glass container forming machine 140 are determined by a glass container measurement system 144 (such as the hot glass container quality analytical system described in FIGS. 1-3 above), which provides as an output a container measurements signal 146 (which may incorporate some or all of the information contained in the combined report data 136 described in FIG. 3 above, or even additional data not mentioned in the description of the combined report data 136 above).

This example of the glass container measurement system 144 is more fully described in European Published Patent Application No. EP 2 336 740 A1, U.S. patent application Publication No. US 2011-0141264 A1, and U.S. patent application Publication No. US 2011/0141265 A1, all of which were incorporated by reference herein in their entirety.

Measurements of various properties of the hot glass containers 142 are made by the glass container measurement system 144. The measurements may, for example, be made using an area or line scan camera that is sensitive in the infrared and visible portions of the E-M (Electro-Magnetic) spectrum. Such measurements may provide, for example, measurements relating to the temperature of the hot glass containers 142. Other measurements made by the glass container measurement system 144 may include the outline of the glass containers, the center line of the glass containers, the lean of the glass containers, the horizontal distribution of glass in the glass containers, the vertical distribution of glass in the glass containers, and/or the diameter of the glass containers.

Additional measurements of other process values 148 within the glass container forming machine 140 are optionally made by various sensors 150, with these measurements of the process values 148 being provided as process measurement values 152. These measurements may provide, for example, measurements relating to the temperature of the blow mold.

For example, such sensors 150 might include, thermocouples or infrared sensors to measure tooling temperature, pressure sensors and flow sensors to measure cooling air properties, pyrometers to measure glass temperature, etc. The resulting process measurements 152 and the container measurements 146 are fed back to a control algorithm-based controller 154, to which initial desired target setpoints 156 are also provided. The control algorithm-based controller 154 computes adjustments to the process 158 whose purpose is to maintain measured container properties and process values as close as possible to the desired target setpoints 156.

The control algorithm-based controller 154 computes desired thermal forming duration values 158 of the various thermal forming durations (e.g., mold contact time, stretch time, blank contact time) to ultimately be applied to the glass container forming machine 140. Many different control algorithms could be used to actually compute the adjustment values. One possibility is to utilize multiple individual proportional-integral-derivative ("PID") control loops with particular process inputs tied to particular measurement and sensor values. Alternately, a multiple-input, multiple-output ("MIMO") controller could also be used to account for coupling between the variables. One attractive algorithm for this purpose would be a form of what is known in the control literature as Internal Model Control ("IMC"), in which an approximate process model is utilized in the computation of the process adjustments. Another attractive possibility would be Model Predictive Control ("MPC"), which utilizes a process model and an online optimization procedure to compute the outputs.

The focus of the closed loop cyclic timing optimizer control system of the present invention is the use of a thermal forming timing adjustment system 160 which transforms the process oriented, desired thermal forming duration values 158 from the control algorithm-based controller 154 into machine timing signals 162 which are ON and OFF cyclic event times (or event angles) and which are applied to the glass container forming machine 140. In order for the glass container forming machine 140 to operate properly, this transformation must take into account the following considerations or constraints:

First, the events must be maintained in a proper cyclic order. For example, the baffle must be seated on top of the blank molds before the plungers can be allowed to press the parisons. The effect of this is that in order to change a single process duration, many event times may need to be changed. For example, if it is desired to leave the parison in the blank mold longer (to increase the blank mold contact time), then the baffle will have to come up later, the blank molds will have to open later, the neck ring arm will have to invert later, the neck rings will have to open later, the blow molds will have to close later, and so on. Thus, it will be appreciated that changing the timing of a single event ripples through the entire process and can require that many other events be changed as well.

Second, sufficient time must be allowed between certain events in order to avoid mechanical interference or collisions. For example, the takeout tong head can't come in to grab the glass containers until after the blowhead is moved sufficiently out of the way. Another example would be potential collisions between the parisons being delivered to the blow molds by the neck-ring arm and the fully blown glass containers being taken out of the blow molds by the takeout mechanism.

Third, all of the forming activities and motions must fit within the available total or common cycle period.

In general, it may not be possible to obtain a given set of desired thermal forming durations while respecting all of the above constraints. In order to achieve the desired value of a certain thermal forming duration, other thermal forming durations may have to be decreased or increased. For example, in order to increase the blow mold contact duration, while avoiding collisions, it may be necessary to decrease the reheat stretch duration within the available cycle time.

In conventional practice, machine timing has been adjusted manually by machine operators/bottle makers who attempt to resolve the conflicts and make necessary compromises to satisfy the above constraints. While it is possible to perform such adjustments manually, the effectiveness of this conflict resolution is highly dependent upon the skill, experience, and motivation of the individual operator. In contrast, if the automatic closed loop adjustment typified by the Control Loop shown in FIG. 4 is to be implemented, it becomes necessary to have an automated process for computing a valid set of event times.

The previous patents referenced above described technology for applying constrained optimization techniques to automatically compute valid machine timings, an approach that will be referred to here as cycle optimization. The application of the techniques described in these patents resulted in an open loop system that was used to assist skilled operators by allowing them to input desired thermal forming durations and then automatically computing and applying a schedule which approximated the desired values as closely as possible. In contrast, the closed loop cyclic timing optimizer control system of the present invention described above with reference to FIG. 4 specifically applies the mathematical approaches described in the earlier patents to the specific problem of automatically computing event times within a closed loop system that utilizes the container measurements 146 and the process measurements 152 obtained from hot glass containers after they have been manufactured.

While the basic approach defined in the previous patents is applicable to the problem of computing event angles within the closed loop, some new extensions to the previously defined technology are also required. In particular, the issue of setting the actual constraint limit values must be addressed. That problem will now be addressed and the proposed solution to that problem will now be described.

The automated calculation of event angles is accomplished by formulating and solving an appropriate constrained optimization of the form:

minimize over $t$, a cost function $$f(t), \text{ such that, } b_L \leq g(t) \leq b_U \qquad \text{Equation 1}$$

where $t$ represents a vector of event times, $f(t)$ is a "cost function" that provides a quantitative measure of how much the thermal forming durations must be compromised in order to satisfy the constraints, and $g(t)$ is a vector valued function of constraint values that must be maintained between lower and upper bounds $b_L$ and $b_U$ respectively.

For example, $f(t)$ may be the sum of the square errors between the desired and achievable thermal forming durations, and $g(t)$ may compute a specific set of branch durations that must be held within upper and lower bounds, e.g. to avoid collisions, to maintain the cycle period, etc.

In the above formulation it can be seen that "opening up" the bounds (decreasing $b_L$ or increasing $b_U$) will generally allow for a better compromise, that is a smaller value for f. Thus it is important that the bounds be set as open as possible, but not so far that problems (e.g., a collision) will occur.

One issue that must be addressed in applying the above formulation to a closed loop control is maintenance of the limit values as close as possible to their maximum range, at least for those active constraints that are currently limiting the achievable compromise. For some limit values, the appropriate limit values are unambiguous. For example, for sequence type constraints, it is only required that the duration between the leading and trailing event is greater than zero.

Other collision constraints between mechanical parts of the glass container forming machine 140 can be computed analytically based upon their known geometry and motion profiles. However, other limit values must still must be ascertained by physical observation. For example, the necessary collision margin (e.g., from the end of invert to the start of takeout-out) in order to avoid contact between the hot glass container being removed from the blow molds and the incoming, swinging parisons as they are inverted, depends upon the exact thermal state of the glass.

An approach for dynamically maintaining suitable values for the constraints within a closed loop control setting will be described with reference to FIG. 5, in which the glass container forming machine 140, the control algorithm-based controller 154, the desired target setpoints 156, and the desired thermal forming duration values 158 are identical to those items in FIG. 4. In addition, the two feedback loops of FIG. 4 (the first feedback loop includes the hot glass containers 142, the glass container measurement system 144, and the container measurements 146, and the second feedback loop includes the process values 148, the sensors 150, and the process measurements 152) are also identical to those items in FIG. 4.

Figure 5:
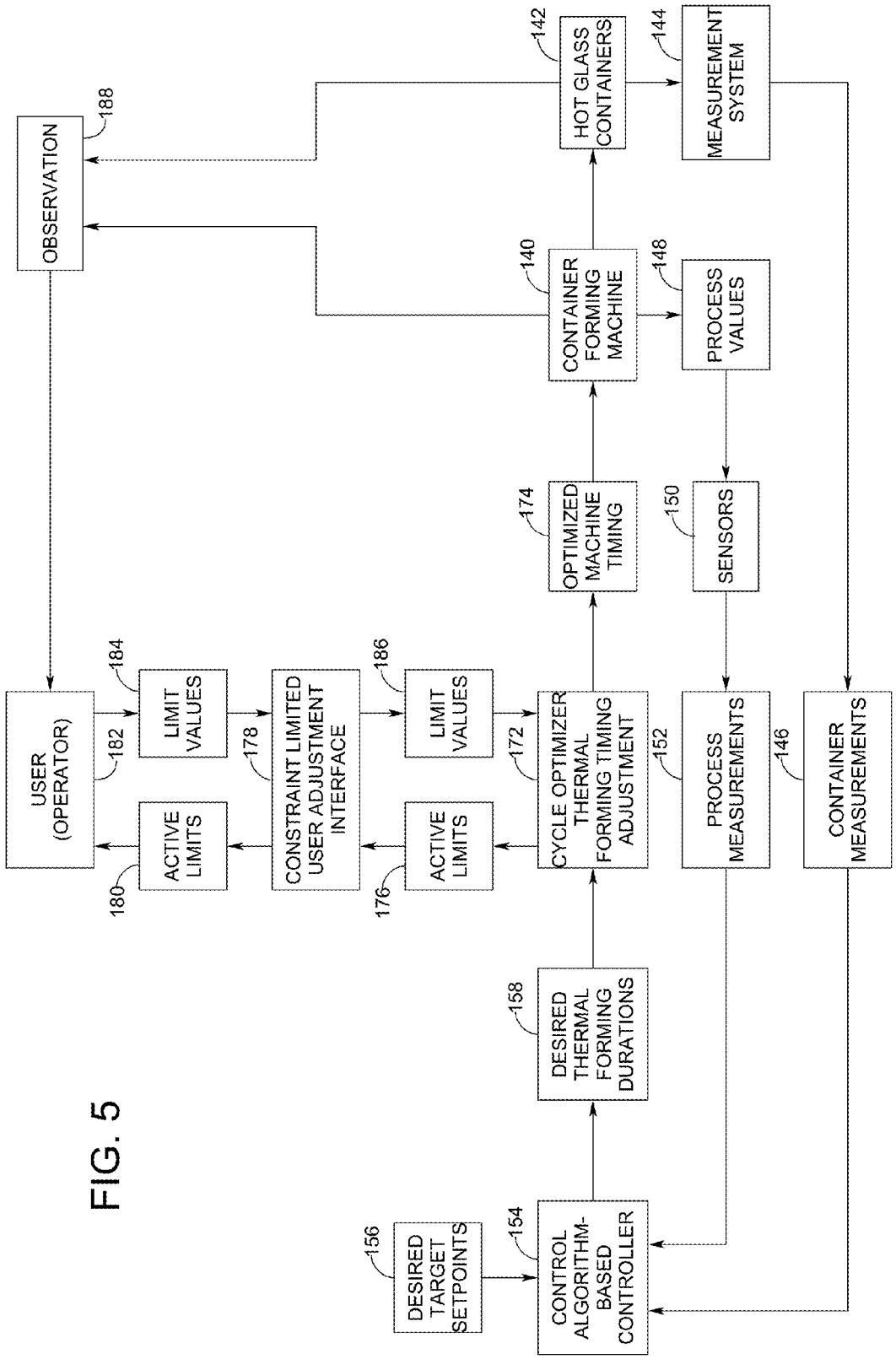
FIG. 5 is a functional schematic depiction of a second embodiment of the closed loop cyclic timing optimizer control system of the present invention which includes dynamic limit adjustment.

The second embodiment shown in FIG. 5 has a closed loop cycle optimizer 172, which transforms the process oriented, desired thermal forming duration values 158 from the control algorithm-based controller 154 into optimized machine timing signals 174 which are ON and OFF cyclic event times (or event angles) and which are applied to the glass container forming machine 140. The closed loop cycle optimizer 172 also provides a list of active limits 176 to a constraint limited user adjustment interface 178.

The active limits 176 are a set of limits that may prevent further improvement in achieving the desired thermal forming durations. It will be appreciated that decreasing an active lower bound, or increasing an active upper bound could allow the actual thermal forming durations to be closer to the desired values. The active limits 176 are provided to the constraint limited user adjustment interface 178, which has an active limits display 180 that is viewable by an operator 182. The operator 182 then has the opportunity to relax one or more of the limit values by using a limit values control 184. The limit values control 184 causes the constraint limited user adjustment interface 178 to provide an updated limit values input 186 to the closed loop cycle optimizer 172, which is then free to further vary the value affected by the modified limits. Optionally, the closed loop cycle optimizer 172 could also modify the cycle period (e.g., make it longer to accommodate process durations).

The operator 182 would then perform an observation 188 of the glass container forming machine 140 as it performs the modified process of manufacturing the hot glass containers 142, and judge whether in fact the active limit was too tight. If the operator 182 judges that one or more limits can be modified, the operator 182 uses the limit values control 184 to enter the changes on the constraint limited user adjustment interface 178, which provides the new limit values input 186 to the closed loop cycle optimizer 172. The updated values are then used in subsequent optimizations made by the closed loop cycle optimizer 172. The resulting, new values of optimized machine timing signals 174 are sent to the glass container forming machine 140. The operator 182 can then observe the effects of having relaxed the constraints and make further modifications to the limits as required. It is noted that additional functionality could also be implemented in order to guide the use so as to avoid the possibility of arriving at a set of inconsistent (infeasible) constraints for which no solution would be possible.

Although it would not provide all the flexibility or features of the constrained optimization methodology outlined above, an alternative, less complex approach is possible which should also be considered. In this approach, for each thermal forming duration of interest (each controller output) the corresponding set of events that must be moved together in order to modify it and keep the subsequent events in proper sequence would be identified in advance.

Although the foregoing description of the closed loop cyclic timing optimizer control system of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A system for automatically optimizing event timing in the operation of an I.S. machine, comprising:
   a glass container measurement system that provides container measurement information indicative of certain characteristics of hot glass containers manufactured by the I.S. machine;
   a controller that uses the container measurement information to produce desired process durations used to operate the I.S. machine to produce glass containers having desired characteristics;
   a cyclic timing adjustment system which automatically transforms the desired process durations from the controller into machine timing signals which are applied to the I.S. machine by imposing constraints to maintain a predetermined cyclic order, to avoid mechanical interference or collisions, and to maintain a predetermined total or common cycle period;
   wherein when the cyclic timing adjustment system adjusts a machine timing signal to increase or decrease a desired process duration, the cyclic timing adjustment system maintains the predetermined total or common cycle period; and wherein when the cyclic timing adjustment system increase one desired process duration, the cyclic timing adjustment system decreases another one of the desired process durations to maintain the predetermined total or common cycle period.

2. A system as defined in claim 1, wherein the certain characteristics of hot glass containers comprise at least one of the group consisting of the temperature of the hot glass containers, the outline of the glass containers, the center line of the glass containers, the lean of the glass containers, the horizontal distribution of glass in the glass containers, the vertical distribution of glass in the glass containers, and the diameter of the glass containers.

3. A system as defined in claim 1, additionally comprising:
   at least one sensor that provides one or more measurements of process values within the I.S. machine, the measurements of process values being provided as process measurement values, the controller using both the process measurement values and the container measurement information to produce desired process durations used to operate the I.S. machine to produce glass containers having desired characteristics.

4. A system as defined in claim 3, wherein the at least one sensor comprises at least one of the group consisting of a thermocouple or infrared sensor to measure tooling temperature, a pressure sensor or a flow sensor to measure cooling air properties, and a pyrometer to measure glass temperature.

5. A system as defined in claim 3, wherein the measurements of process values comprise measurements relating to the temperature of the blow mold.

6. A system as defined in claim 3, wherein initial desired target setpoints are provided to the system, and wherein the controller computes the desired process durations to maintain the container measurement information and the process measurement values as close as possible to the desired target setpoints.

7. A system as defined in claim 1, wherein said cyclic timing adjustment system comprises:
   a closed loop cycle optimizer that automatically transforms the desired process durations from the controller into machine timing signals which are applied to the I.S. machine, the closed loop cycle optimizer imposing active limits on the machine timing signals that are provided by the closed loop cycle optimizer for application to the I.S. machine.

8. A system as defined in claim 7, additionally comprising:
   a constraint limited user adjustment interface that allows an operator to vary the active limits on the machine timing signals that are provided by the closed loop cycle optimizer for application to the I.S. machine.

9. A system as defined in claim 8, wherein the closed loop cycle optimizer is arranged and configured to modify the length of a cycle period to make it longer to accommodate process durations.

10. A system as defined in claim 1, wherein the glass container measurement system is arranged and configured to monitor radiation emitted by hot glass containers after they are formed and before they are cooled as they are conveyed away from the I.S. machine.

11. A system as defined in claim 10, wherein the glass container measurement system comprises:
   at least one imaging device for monitoring radiation emitted by hot glass containers after they are formed and as they are conveyed away from the I.S. machine.

12. A system for automatically optimizing event timing in the operation of an I.S. machine, comprising:
   a glass container measurement system that is arranged and configured to monitor radiation emitted by hot glass containers after they are formed and before they are cooled as they are conveyed away from the I.S. machine, said glass container measurement system providing container measurement information indicative of certain characteristics of hot glass containers manufactured by the I.S. machine;
   at least one sensor that provides one or more measurements of process values within the I.S. machine, the measurements of process values being provided as process measurement values;
   a controller that uses the process measurement values and the container measurement information to produce desired process durations used to operate the I.S. machine to produce glass containers having desired characteristics;
   a cyclic timing adjustment system which automatically transforms the desired process durations from the controller into machine timing signals which are applied to the I.S. machine by imposing constraints to maintain a predetermined cyclic order, to avoid mechanical interference or collisions, and to maintain a predetermined total or common cycle period;
   wherein when the cyclic timing adjustment system adjusts a machine timing signal to increase or decrease a desired process duration, the cyclic timing adjustment system maintains the predetermined total or common cycle period; and
   wherein when the cyclic timing adjustment system increases one desired process duration, the cyclic timing adjustment system decreases another one of the desired process durations to maintain the predetermined total common cycle period.

13. A method for automatically optimizing event timing in the operation of an I.S. machine, comprising:
   providing container measurement information indicative of certain characteristics of hot glass containers manufactured by the I.S. machine;
   using the container measurement information to produce desired process durations used to operate the I.S. machine to produce glass containers having desired characteristics;
   automatically transforming the desired process durations from the controller into machine timing signals which are applied to the I.S. machine by imposing constraints to maintain a predetermined cyclic order, to avoid mechanical interference or collisions, and to maintain a predetermined total or common cycle period;
   wherein automatically transforming the desired process durations from the controller into machine timing signals includes adjusting a machine timing signal to increase or decrease a desired process duration while maintaining the predetermined total or common cycle period; and
   wherein when automatically transforming the desired process duration from the controller into machine timing signals includes adjusting a machine timing signal to increase one desired process duration another desired process duration is decreased to maintain the predetermined total or common cycle period.

14. A method as defined in claim 13, wherein the certain characteristics of hot glass containers comprise at least one of the group consisting of the temperature of the hot glass containers, the outline of the glass containers, the center line of the glass containers, the lean of the glass containers, the horizontal distribution of glass in the glass containers, the vertical distribution of glass in the glass containers, and the diameter of the glass containers.

15. A method as defined in claim 13, additionally comprising:
   providing one or more measurements of process values within the I.S. machine, the measurements of process values being used together with the container measurement information to produce desired process durations used to operate the I.S. machine to produce glass containers having desired characteristics.

16. A method as defined in claim 15, wherein the measurements of process values comprise measurements relating to the temperature of the blow mold.

17. A method as defined in claim 13, wherein active limits are imposed on the machine timing signals that are provided by the closed loop cycle optimizer for application to the I.S. machine.

18. A method as defined in claim 17, additionally comprising:
   varying active limits on the machine timing signals that are provided for application to the I.S. machine.

19. A method as defined in claim 18, additionally comprising:
   modifying the length of a cycle period to make it longer to accommodate process durations.

20. A method as defined in claim 13, wherein the providing container measurement information step comprises:
   monitoring radiation emitted by hot glass containers with at least one imaging device.

* * * * *

UNITED STATES PATENT AND TRADEMARK OFFICE
CERTIFICATE OF CORRECTION

PATENT NO. : 9,523,980 B2  
APPLICATION NO. : 13/369750  
DATED : December 20, 2016  
INVENTOR(S) : Jonathan S. Simon Page 1 of 1

It is certified that error appears in the above-identified patent and that said Letters Patent is hereby corrected as shown below:

In the Claims

In Column 12, Claim 13, Line 59, the word "duration" should correctly read --durations--

Signed and Sealed this
Ninth Day of May, 2017

Michelle K. Lee
*Director of the United States Patent and Trademark Office*